United States Patent
Haas et al.

[11] Patent Number: 6,102,240
[45] Date of Patent: Aug. 15, 2000

[54] ANIMATED KETTLE

[75] Inventors: Joel C. Haas, Jupiter; Daryl H. Michaelian, Stuart, both of Fla.; Peter E. Weiss, New York, N.Y.; Douglas C. Ferrin, West Palm Beach, Fla.

[73] Assignee: M. Kamenstein, Inc., Elmsford, N.Y.

[21] Appl. No.: 09/339,642

[22] Filed: Jun. 24, 1999

Related U.S. Application Data

[63] Continuation of application No. 09/055,162, Apr. 4, 1998, Pat. No. 5,950,862.

[51] Int. Cl.⁷ .................................................. B65D 1/34
[52] U.S. Cl. ...................... 220/573.1; 220/912; 206/457; 116/70; 116/137 R
[58] Field of Search ............................. 220/575.1, 573.5, 220/912, DIG. 13; 206/457; 116/70, 137 R

[56] References Cited

U.S. PATENT DOCUMENTS

| | | | |
|---|---|---|---|
| 71,236 | 11/1867 | Smith | 220/573.1 |
| 81,186 | 8/1868 | Manning | 220/573.1 |
| 86,849 | 2/1869 | Manning | 220/573.1 |
| 105,347 | 7/1970 | Manning | 220/573.1 |
| 2,989,813 | 6/1961 | Hess, Sr. | 206/457 |
| 2,997,788 | 8/1961 | Gilbert | 206/457 |
| 3,791,550 | 2/1974 | Duncan | 206/457 |
| 4,813,368 | 3/1989 | Hutter, III et al. | |
| 5,551,415 | 9/1996 | Cartossi | 220/573.1 |
| 5,950,862 | 9/1999 | Haas et al. | 220/457 |

*Primary Examiner*—Joseph M. Moy
*Attorney, Agent, or Firm*—Robert A. Koons, Jr.; James W. Bolcsak; Pepper Hamilton LLP

[57] ABSTRACT

A kettle for boiling water which uses steam power to drive a rotatable outer housing for providing animation is disclosed.

14 Claims, 22 Drawing Sheets

Fig. 7    70

ANIMATED KETTLE

This application is a continuation of U.S. patent application, Ser. No. 09/055,162, filed Apr. 4, 1998 now U.S. Pat. No. 5,950,862.

FIELD OF THE INVENTION

The present invention relates to kitchen articles having novelty value as well as utilitarian value. In particular, the present invention relates to kettles for boiling water which provide amusement during use by means of steam powered animation, and to kettles which give a visual signal that water is boiling.

BACKGROUND OF THE INVENTION

Conventional kettles for boiling water are vessels or containers for holding water to be boiled. Such kettles are used simply for containing water on a stove while heat is supplied by a gas burner or an electric heating element to the contained water. A conventional kettle frequently has an ornamental design of some type but has a disadvantage in being usually regarded as a utilitarian kitchen utensil. It would be desirable to have a kettle for boiling water which can provide amusement while in use.

A conventional kettle for boiling water is frequently equipped with a whistle mechanism of some sort to serve as a signalling device. Such a whistle provides an audible signal to a user of the kettle that the water contained therein is boiling. It has long been known that a signal to the user of the contained water having reached boiling is an advantage to the kettle user. The user of a kettle which can provide a signal of boiling will be able to carry out a task in the kitchen while water is coming to a boil, and so such a signal is considered an advantage. For those persons who are hearing impaired, a conventional kettle equipped with a whistle offers no advantage. A kettle which can alert the user of the boiling of water with a visual signal would be advantageous for such persons. A kettle which could furnish a visual signal of boiling and also some amusement would be desirable to users of hot water in the home.

It is an object of the present invention to provide a kettle for boiling water which also provides amusement for the user of the kettle while water is boiling.

It is an object of the present invention to provide a kettle for boiling water which furnishes a visual signal to a user of the kettle that the water is boiling.

It is a further object of the present invention to provide a kettle for boiling water which uses steam powered motion to alert a user of the kettle to the fact that the water in the kettle is boiling.

SUMMARY OF THE INVENTION

A kettle for boiling water is disclosed, the kettle also providing steam powered animation, and a visual indication when water in the kettle is boiling. In one type of embodiment of the present invention, the kettle in accordance with the invention comprises a generally round kettle body with an interior and an exterior, a horizontal bottom, a side continuous with the bottom, the side extending upwardly, then extending inwardly to form a shoulder, and then extending upwardly to a termination; a fixed outer housing joined to the termination of the kettle body wall, and having an opening for introduction of water into the kettle body; a rotatable housing mounted for rotation upon the shoulder of the kettle body, comprising a generally circular rotatable housing body for holding at least one ornament for rotation about the kettle body, a bearing assembly for supporting the rotatable housing body upon the shoulder, the bearing assembly comprising a plurality of generally vertical turbine blades for engagement with steam from the kettle body. The kettle body further comprises a hollow spout for pouring of water, the spout having a first end and a second end, the first end extending from the interior of the kettle body to the exterior of the kettle body; a spout cap removably engaged to the second end of the spout, at least one steam jet mounted through the shoulder of the kettle body and directed at an angle selected to impinge upon the plurality of turbine blades for causing rotation of the rotatable housing, and a handle mounted on the kettle body. The fixed outer housing further comprises a lid removably engaged to the opening for introduction of water. The lid and the spout cap are engaged with a dimple and ramp arrangement or any other closure locking arrangement known in the art of kitchen utensil design to allow the pressure of steam in a kettle to build to from about 0.5 psi to about 1.5 psi. It is preferred that a sealing gasket be fitted within the spout cap and also one within the lid to aid in holding steam pressure to a value within this range of about 0.5 psi to about 1.5 psi. It is preferred that the diameter of the steam jet used be from about 0.05 inch to about 0.1 inch. This diameter has been found to provide a suitable amount of animation with the rotation of the rotatable housing that results.

BRIEF DESCRIPTION OF THE DRAWINGS

A full understanding of the animated kettle according to the present invention may be had by reading the following description, and may be aided by consideration of the drawings included herewith, wherein.

DETAILED DESCRIPTION OF THE INVENTION

Figure 1:
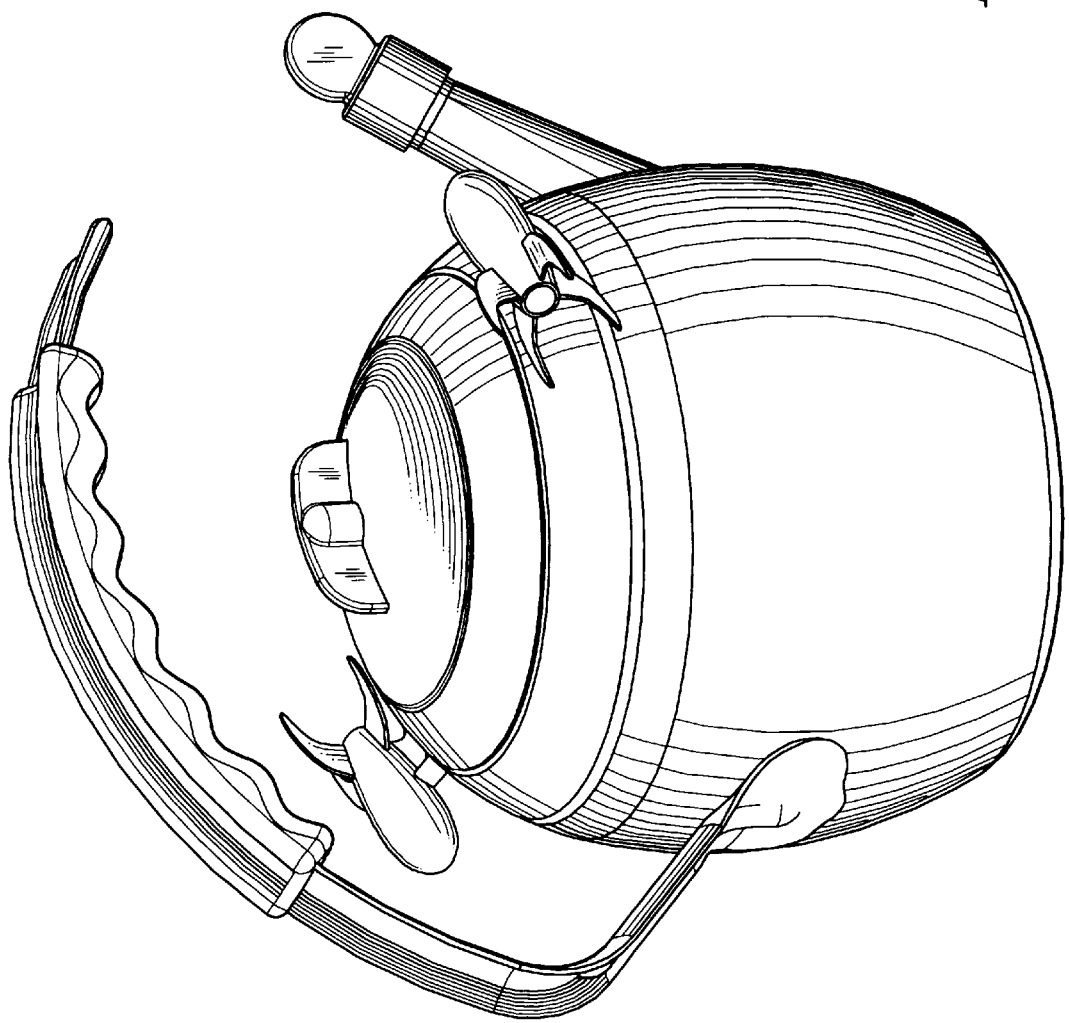
FIG. 1 shows a perspective view of a first embodiment of a kettle in accordance with the invention.
Figure 2:
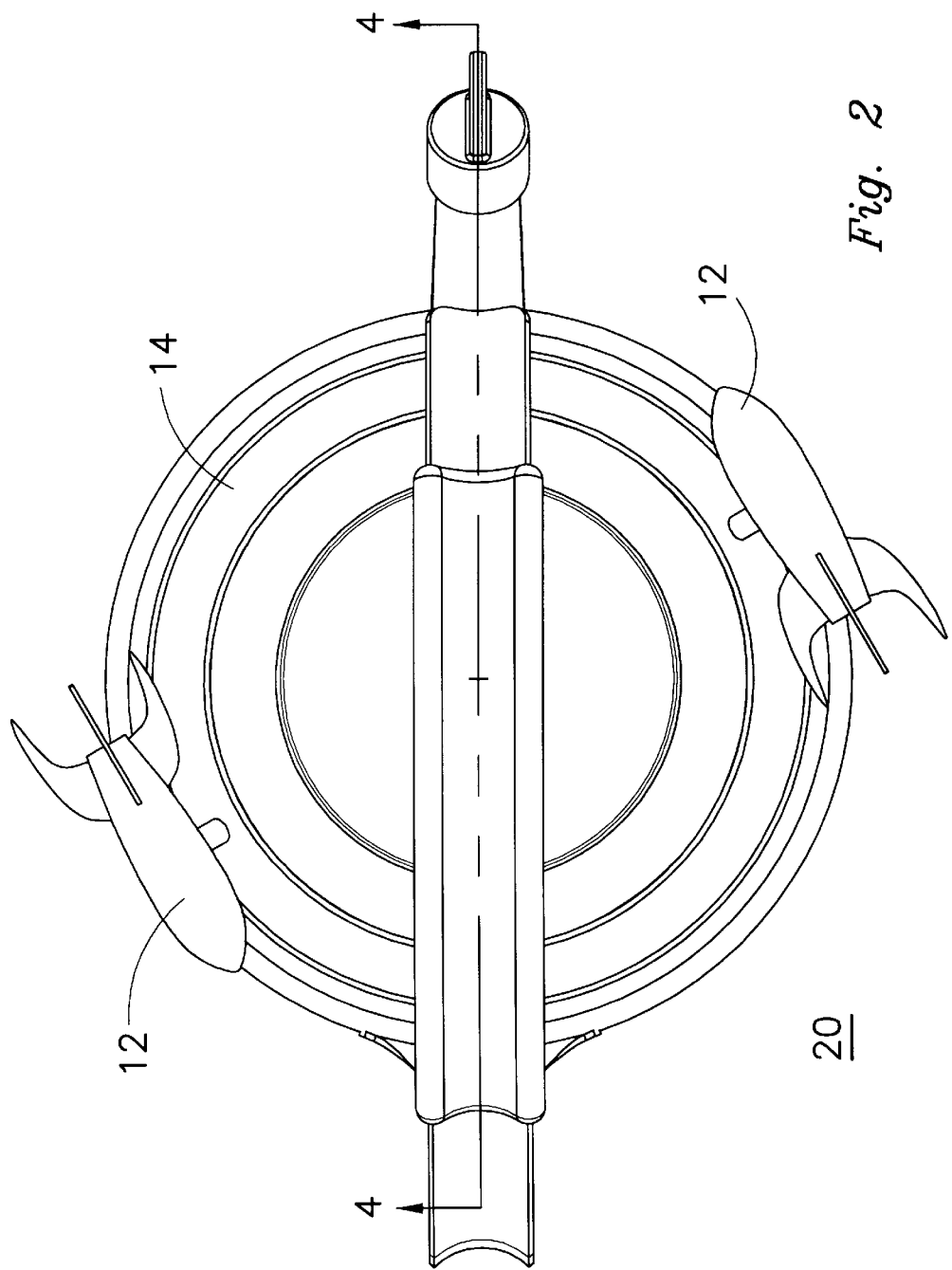
FIG. 2 shows a top view of the first embodiment.
Figure 3:
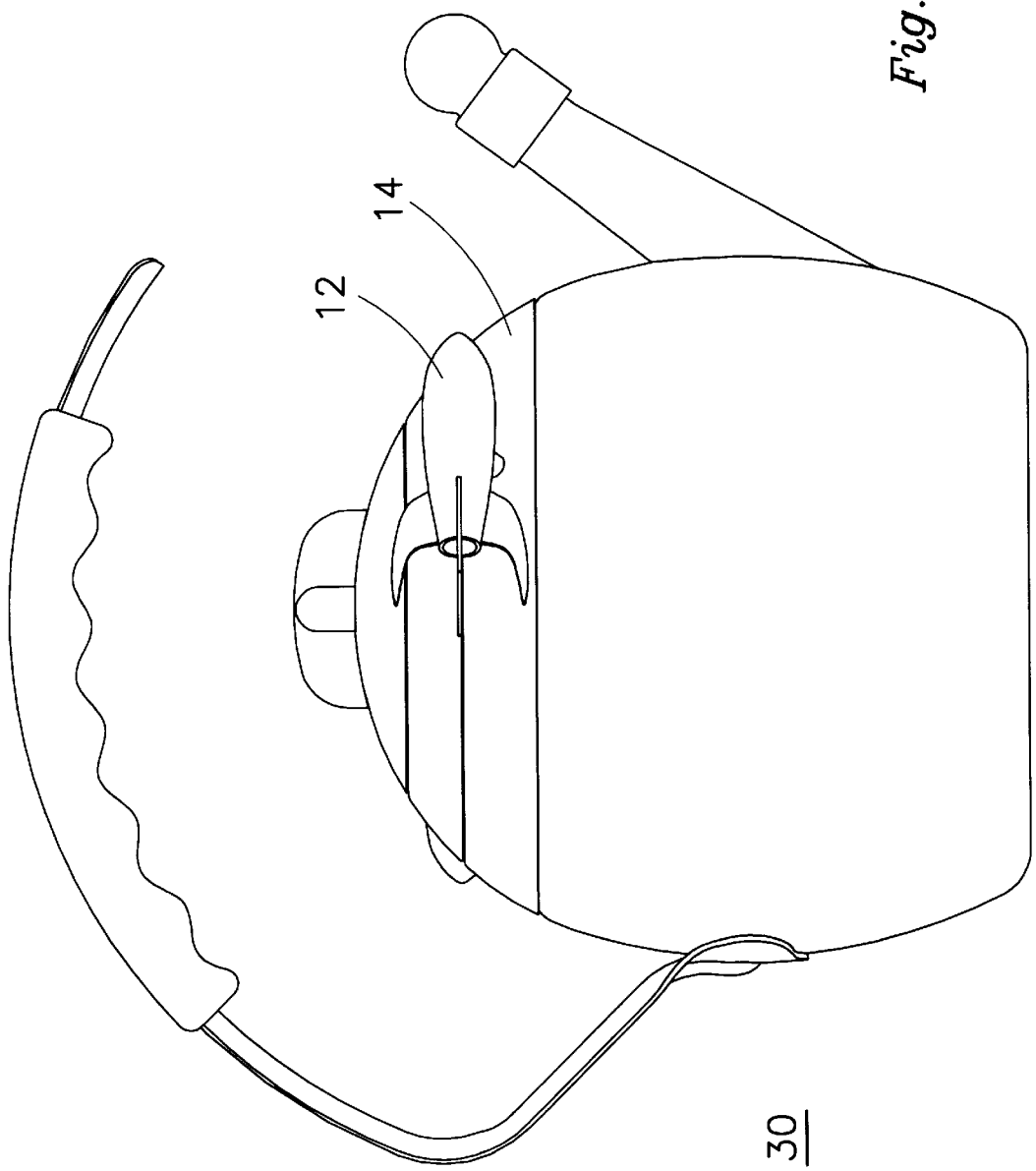
FIG. 3 shows a side view of the first embodiment.
Figure 4:
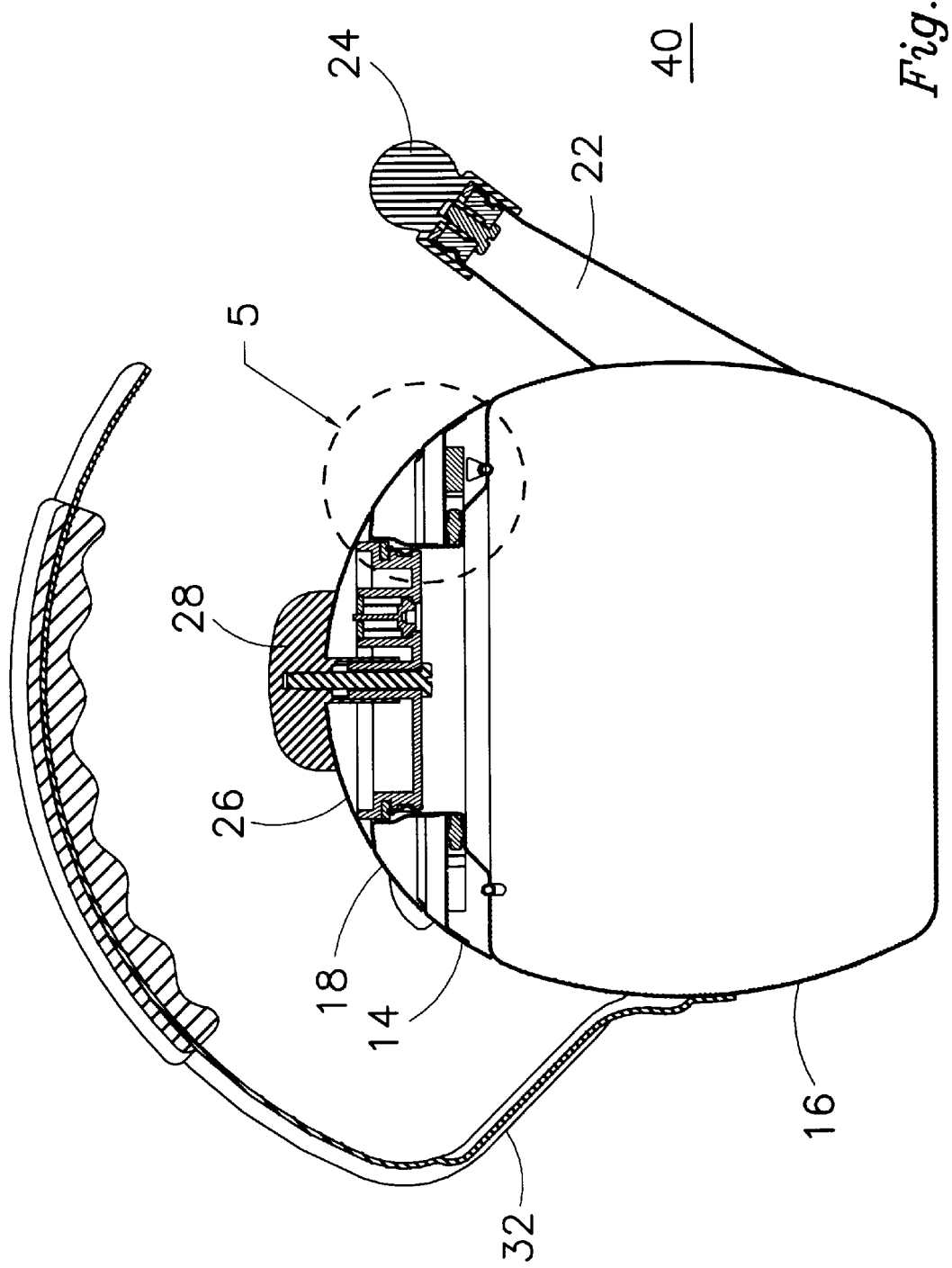
FIG. 4 shows a sectional side view of the first embodiment.
Figure 5:
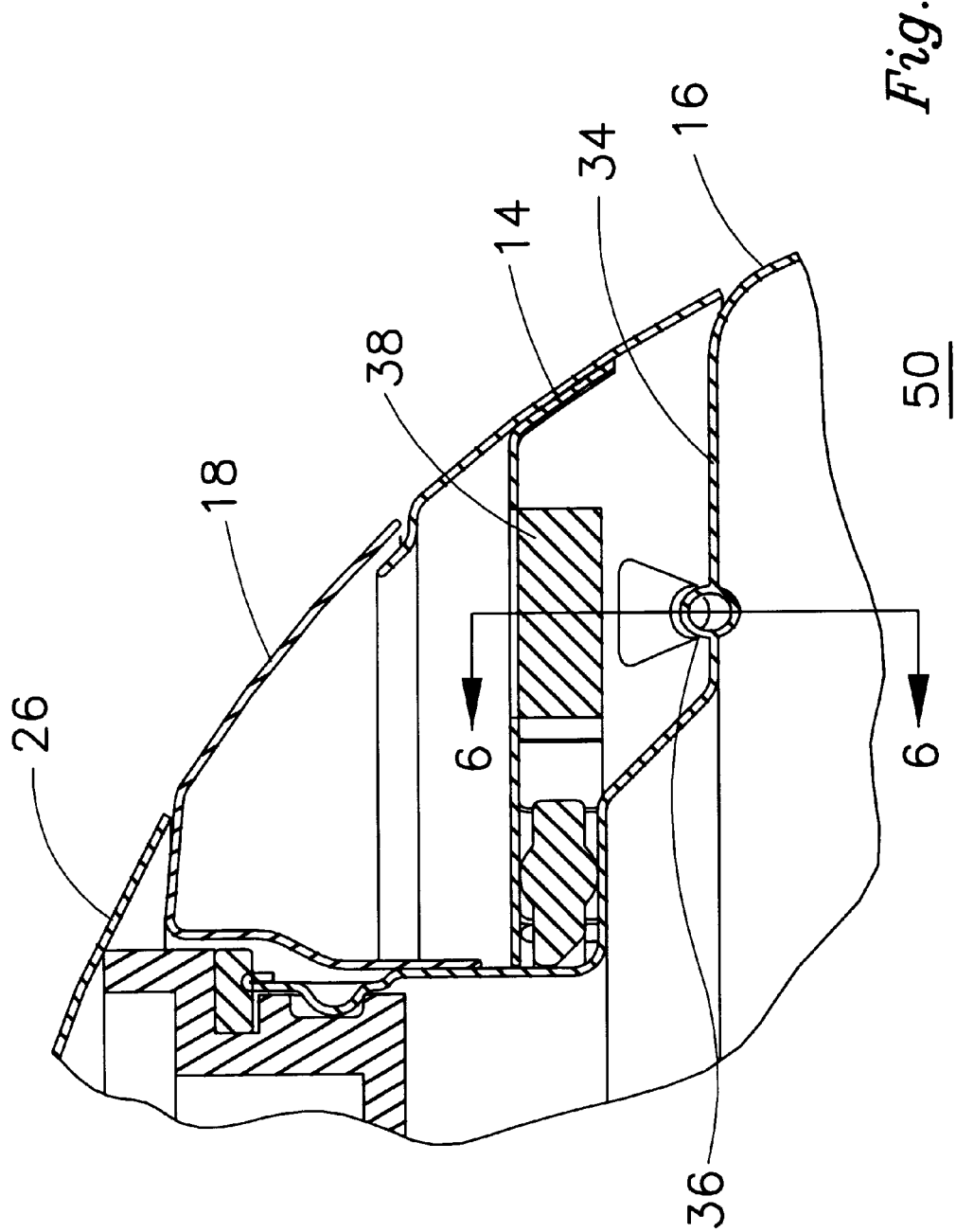
FIG. 5 shows a detail of the view of FIG. 4.
Figure 6:
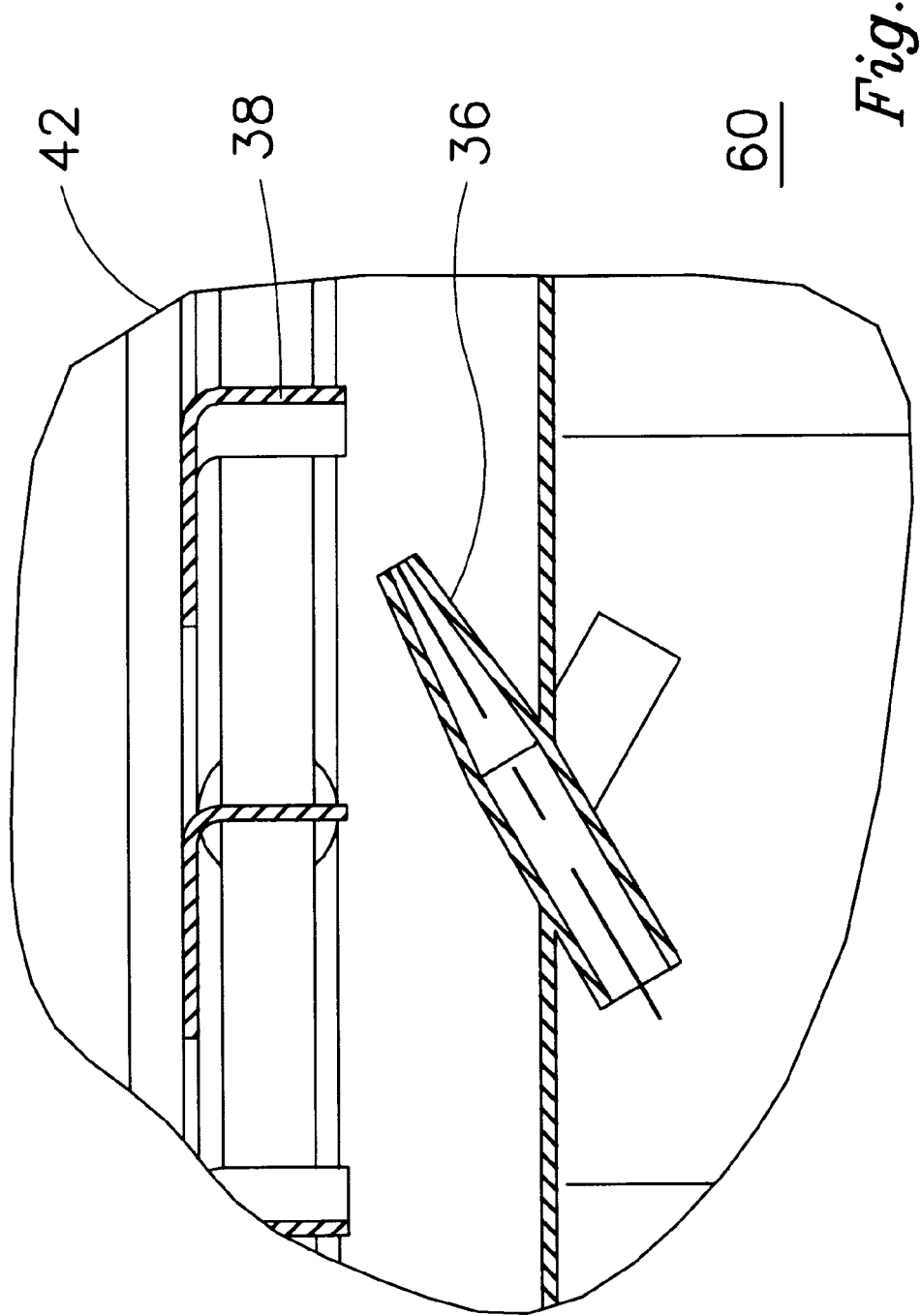
FIG. 6 shows detailed view of the view of a detail of FIG. 5.
Figure 7:
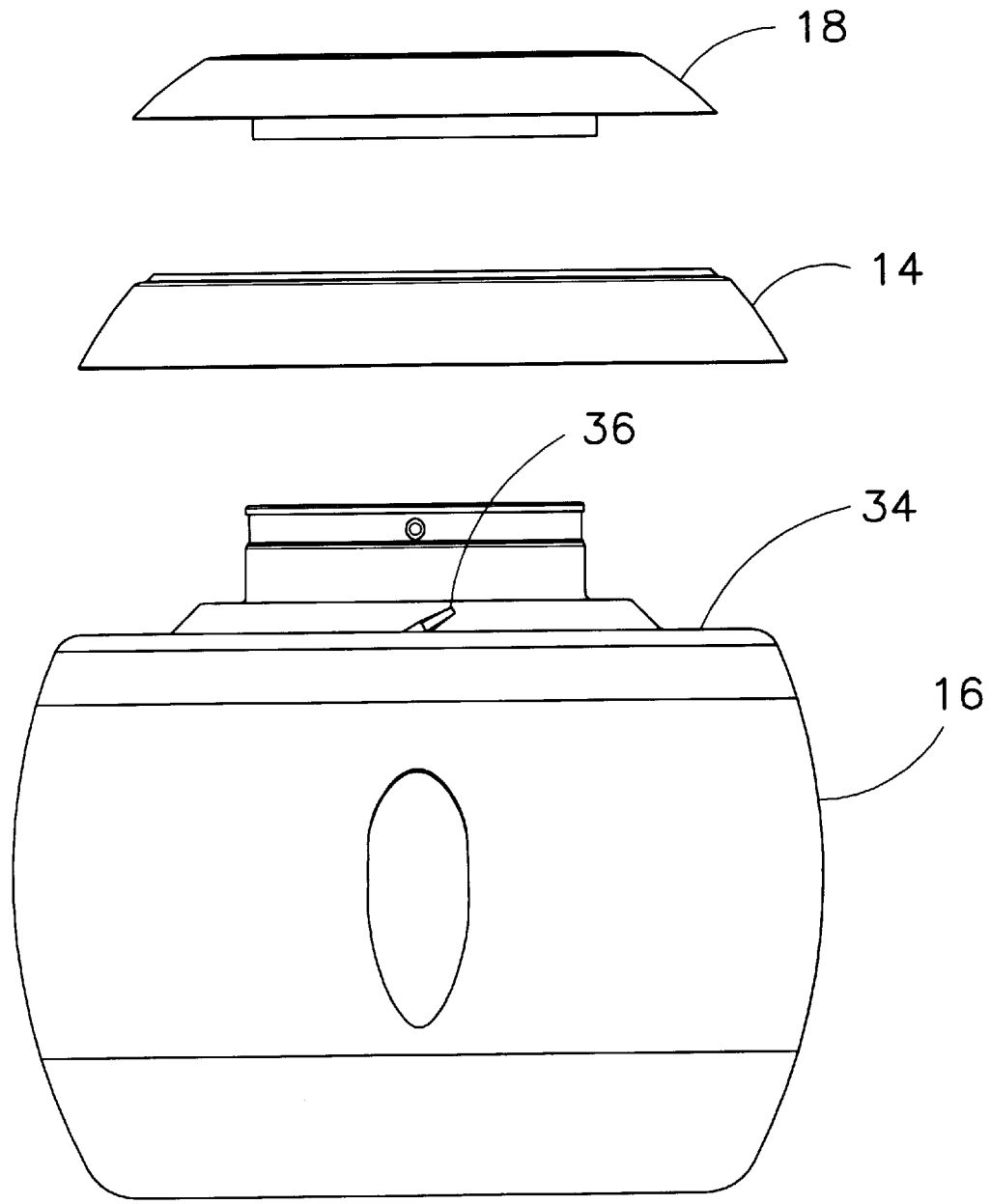
FIG. 7 shows an exploded view of portions of the first embodiment.
Figure 8:
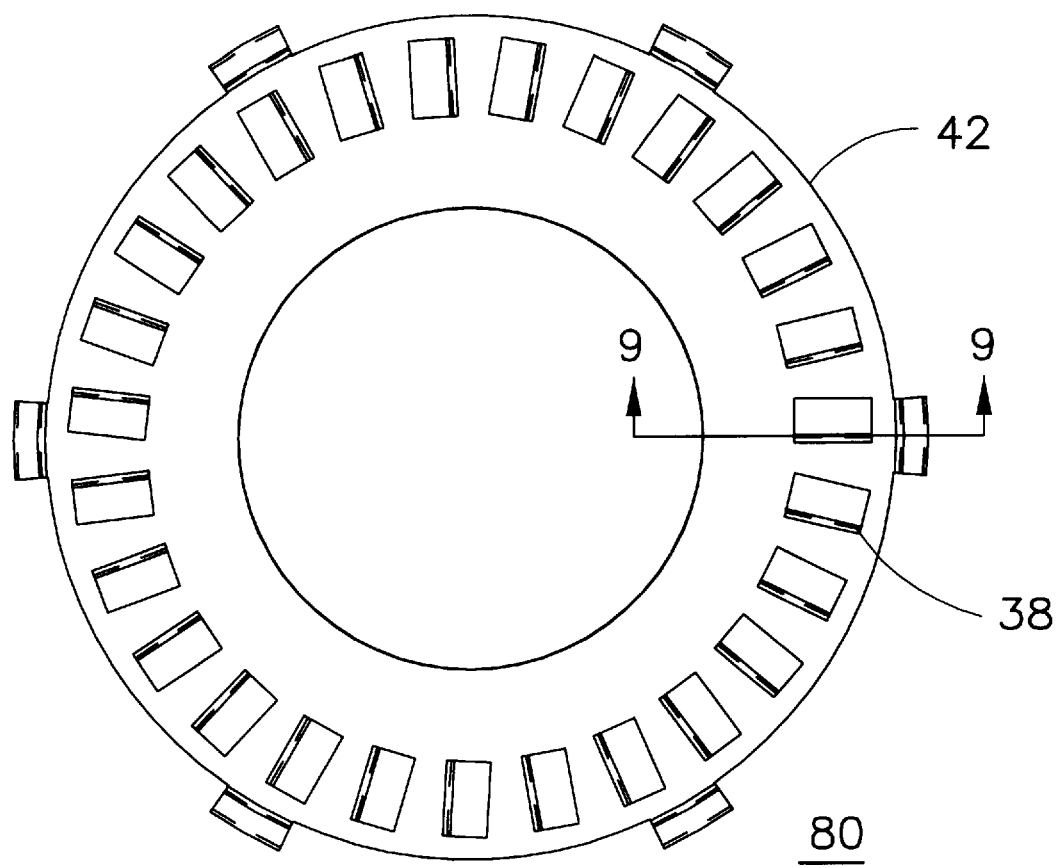
FIG. 8 shows a top view of a turbine of the first embodiment and of a second embodiment.
Figure 9:
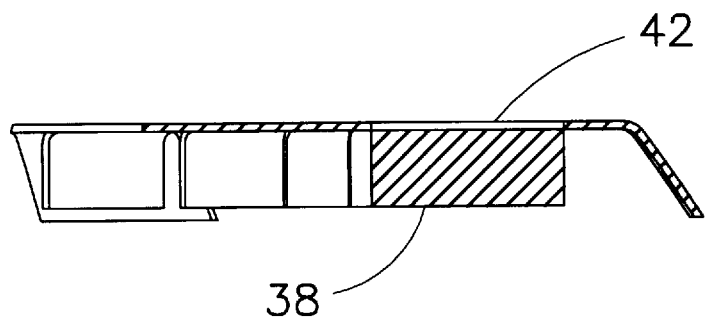
FIG. 9 shows a sectional view of the turbine of FIG. 8.

The invention and the variations of implementation of the teachings of the invention will be understood better from an examination of the accompanying drawings. First turning to FIG. 1, a first embodiment 10 of a kettle according to the invention is illustrated. FIG. 2 shows two ornaments 12 fixed to the rotatable housing 14 of this embodiment. In FIG. 4 is shown a sectional view illustrating the kettle body 16, the rotatable housing 14, the fixed outer housing 18, a spout 22, a spout cap 24, a lid 26 with a lid handle 28, and a handle 32 mounted on the kettle body. In FIG. 6 may be seen greater detail of the relationship between the elements recited in the description of FIG. 4. Also shown in this last figure is the shoulder 34 of the kettle body, a steam jet 36 extending through the shoulder of the kettle body, and a turbine blade 38. In FIG. 6 is seen a steam jet, a turbine blade positioned for impingement of steam from the jet, and a portion of a bearing assembly 42. In FIG. 8 and FIG. 9 are seen the relationship of the turbine blades of the invention to the bearing assembly which supports and drives the rotatable housing.

Figure 10:
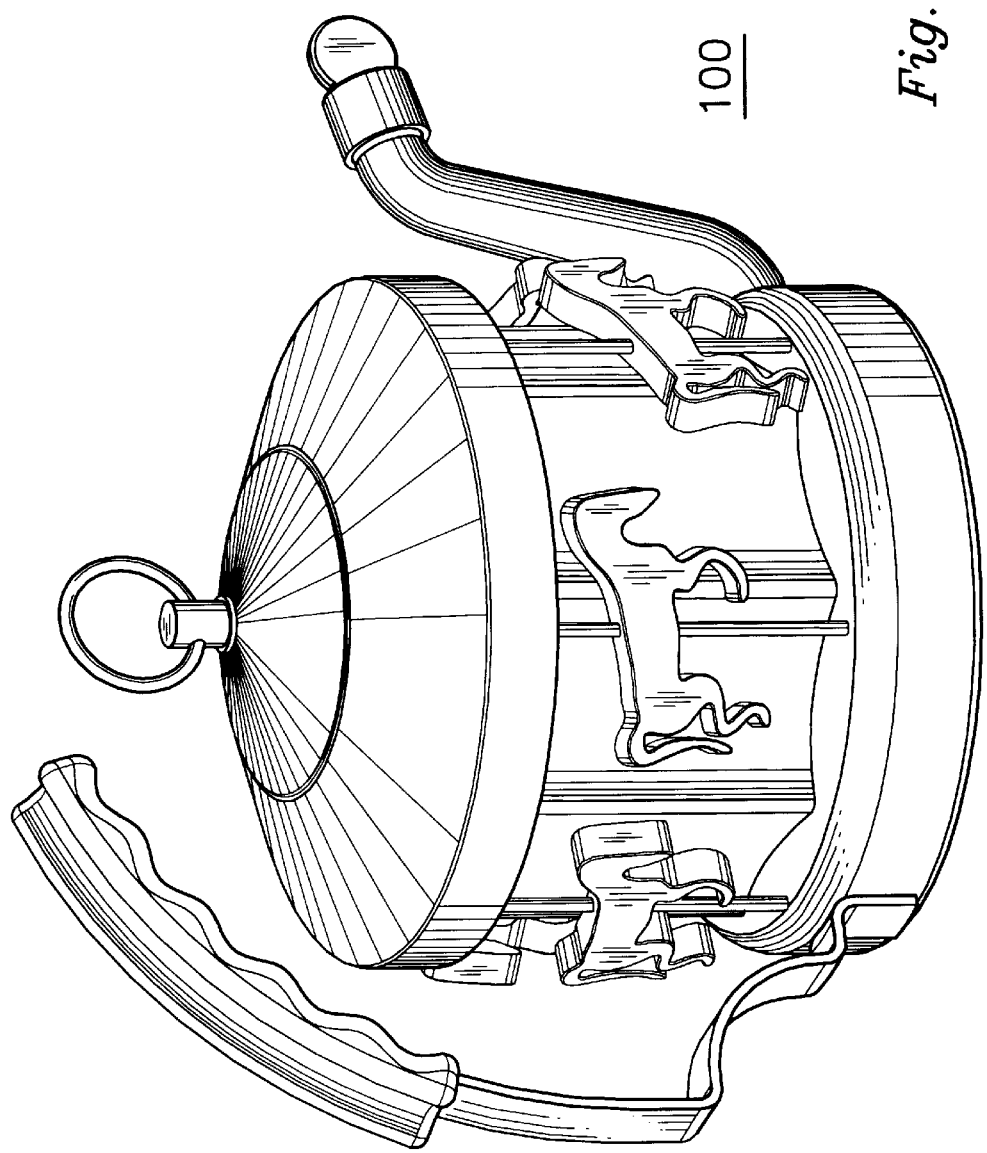
FIG. 10 shows a perspective view of a second embodiment of the invention.
Figure 11:
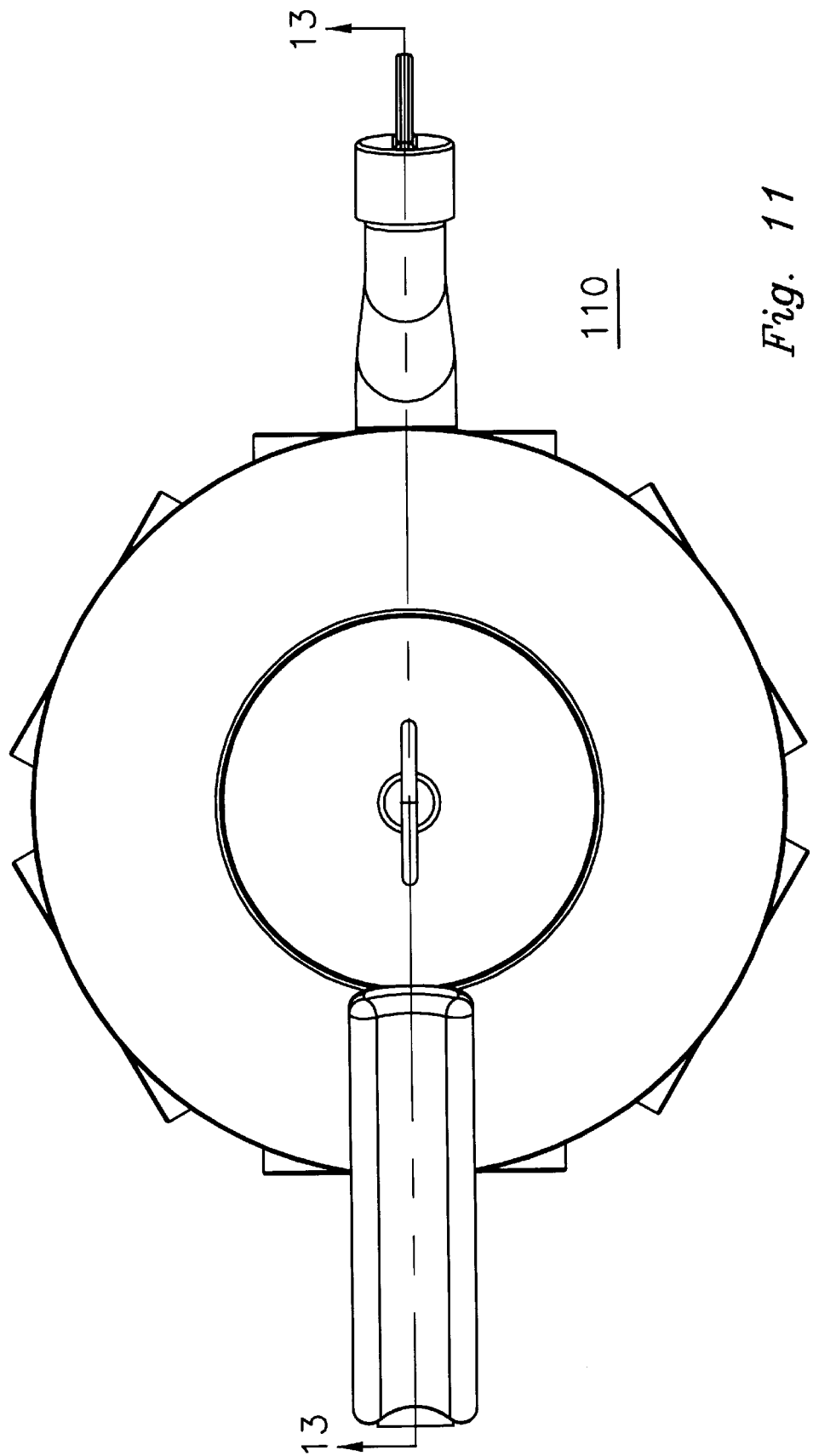
FIG. 11 shows a top view of the embodiment of FIG. 10.
Figure 12:
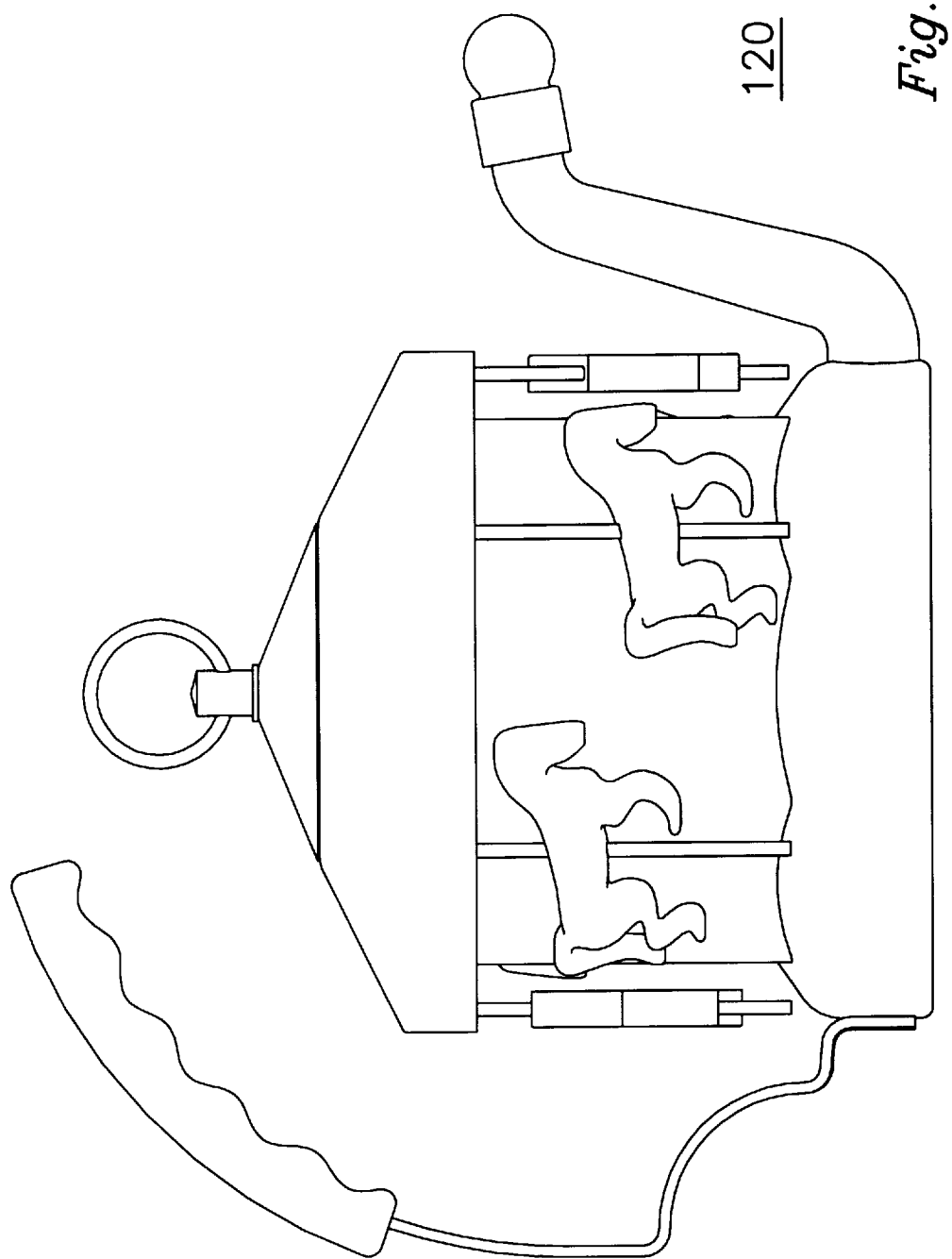
FIG. 12 shows a side view of the embodiment of FIG. 10.
Figure 13:
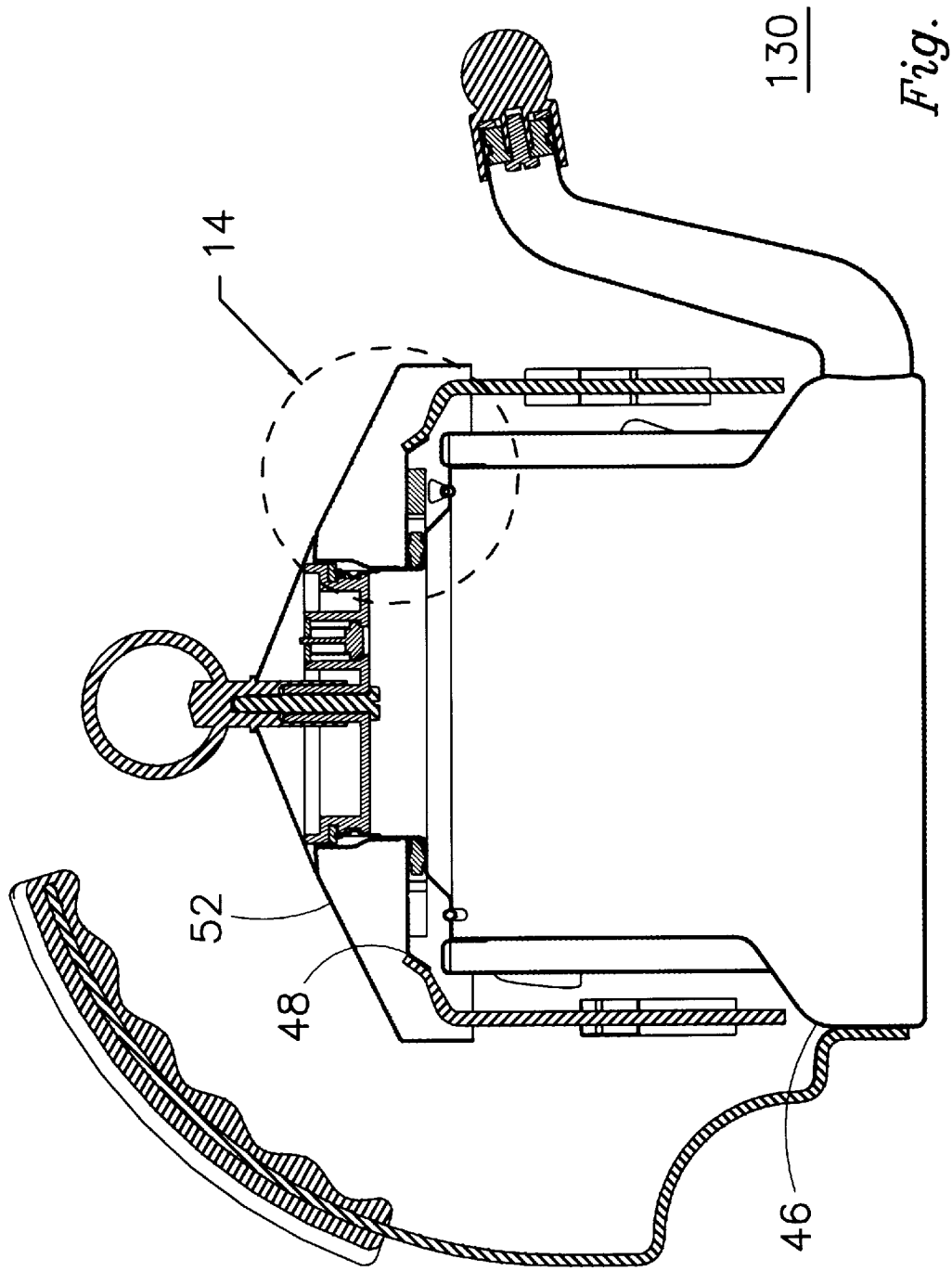
FIG. 13 shows a sectional side view of the embodiment of FIG. 10.
Figure 14:
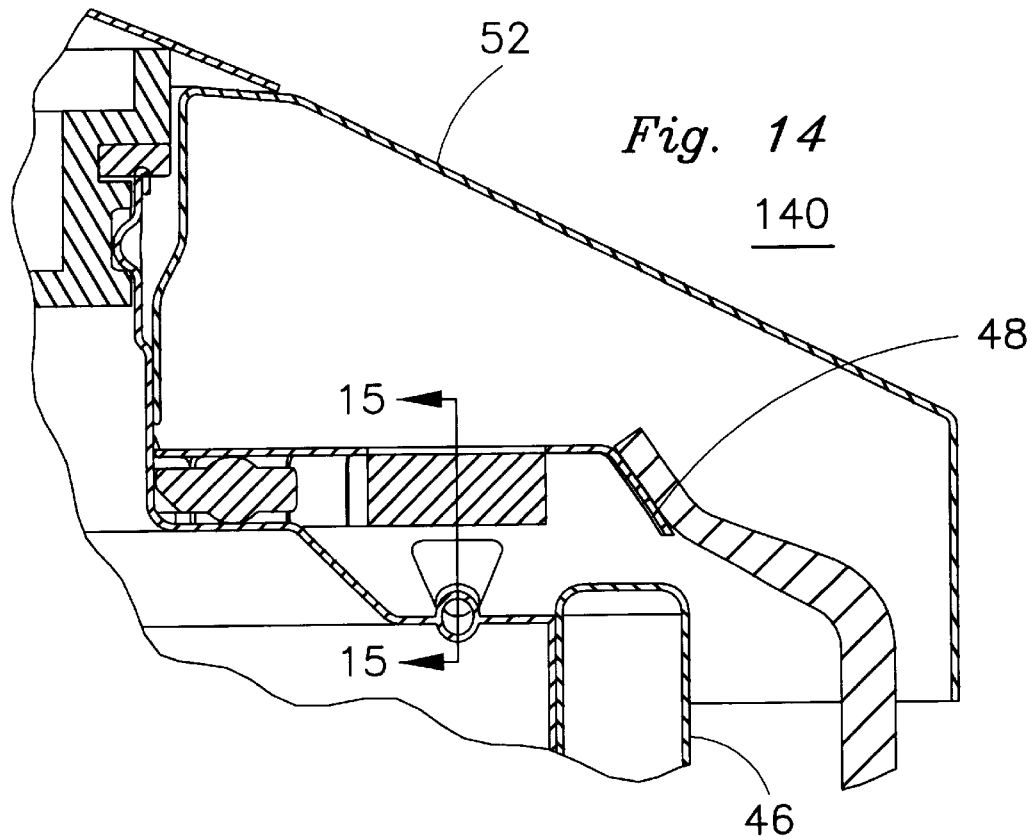
FIG. 14 shows a sectional view of a detail of FIG. 13.
Figure 15:
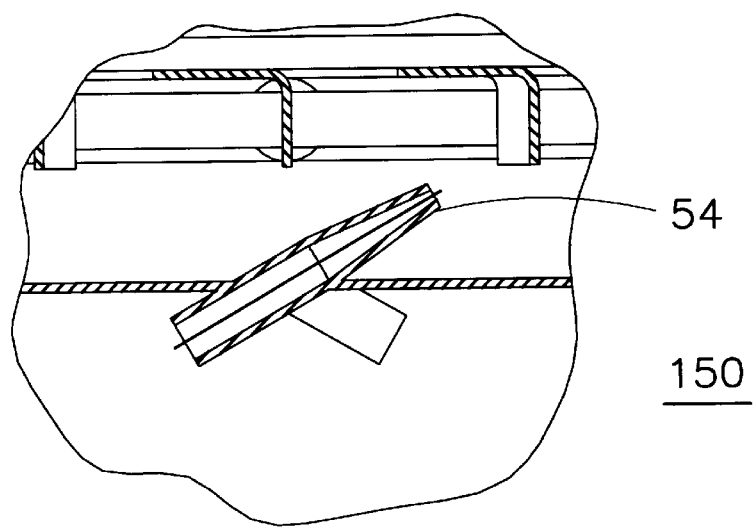
FIG. 15 shows a sectional view of a detail of FIG. 14.
Figure 16:
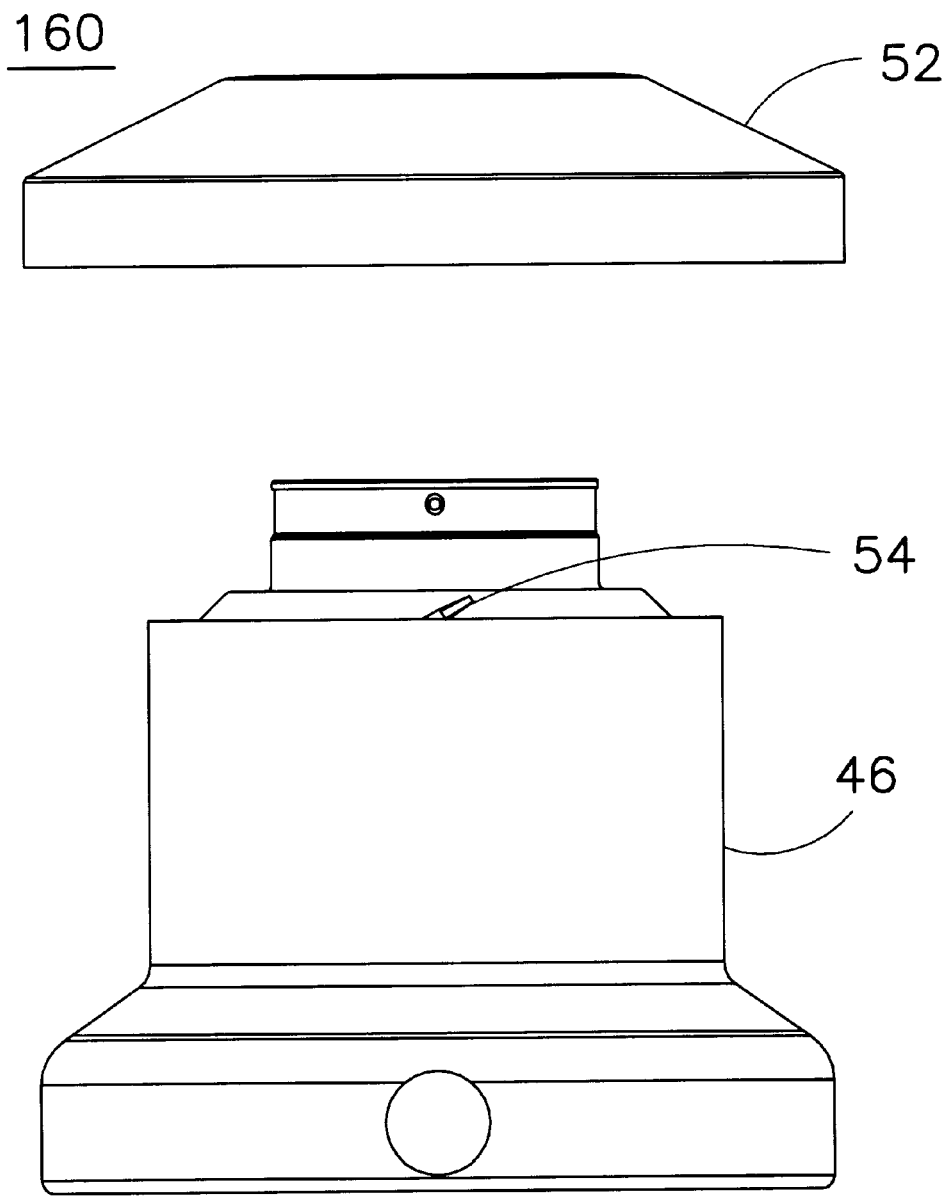
FIG. 16 shows an exploded view of portions of the second embodiment.
Figure 17:
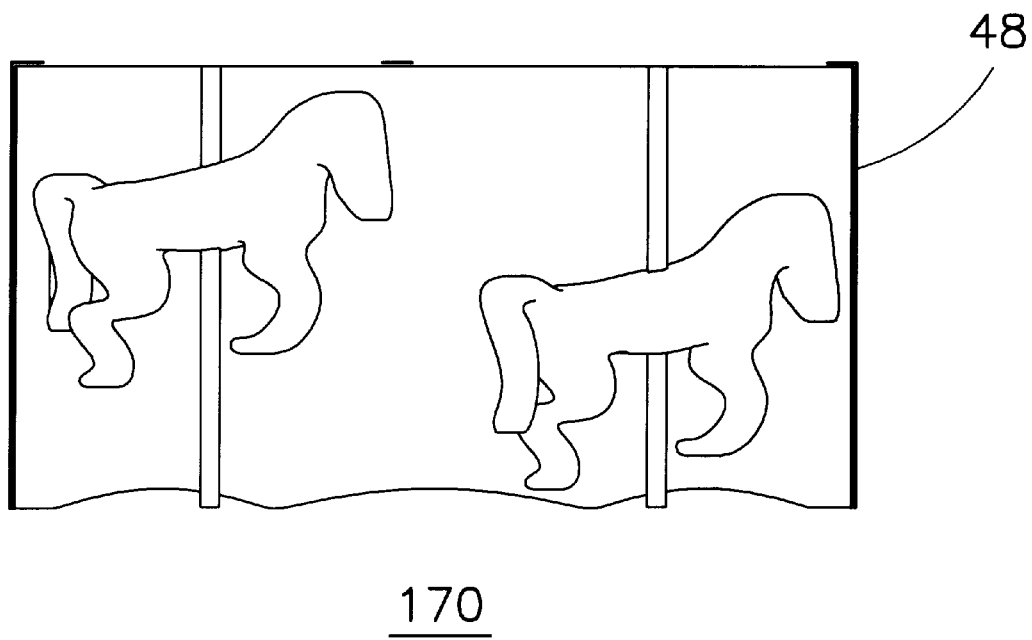
FIG. 17 shows a side view of a portion of the second embodiment.

FIG. 10 illustrates a second embodiment. For this embodiment a detailed view is available in the sectional view of FIG. 13. For this embodiment, the kettle body 46 is shown along with the rotatable housing 48 and the fixed outer housing 52. A jet 54 is provided for impinging steam on a corresponding turbine blade using a bearing assembly similar to that shown in FIG. 8.

Figure 18:
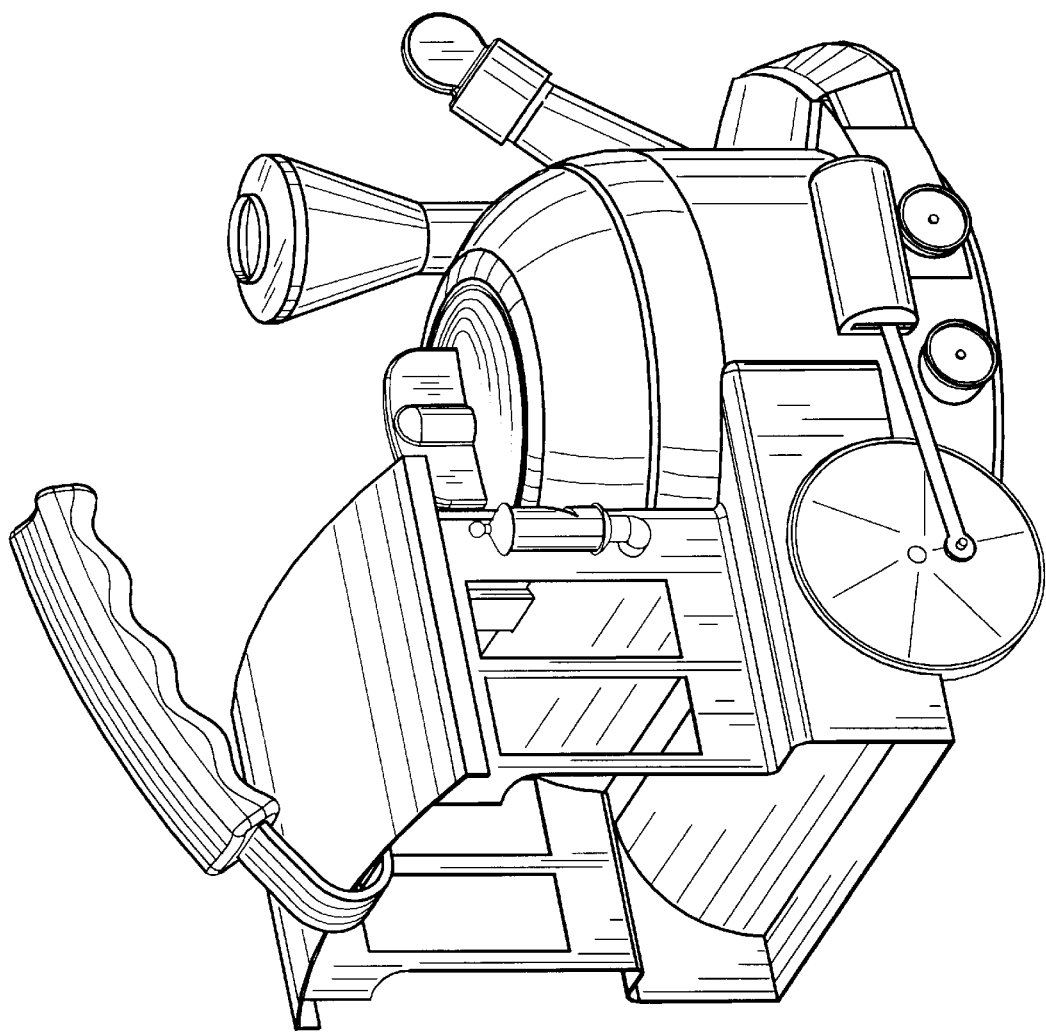
FIG. 18 shows a perspective view of a third embodiment of the invention.
Figure 19:
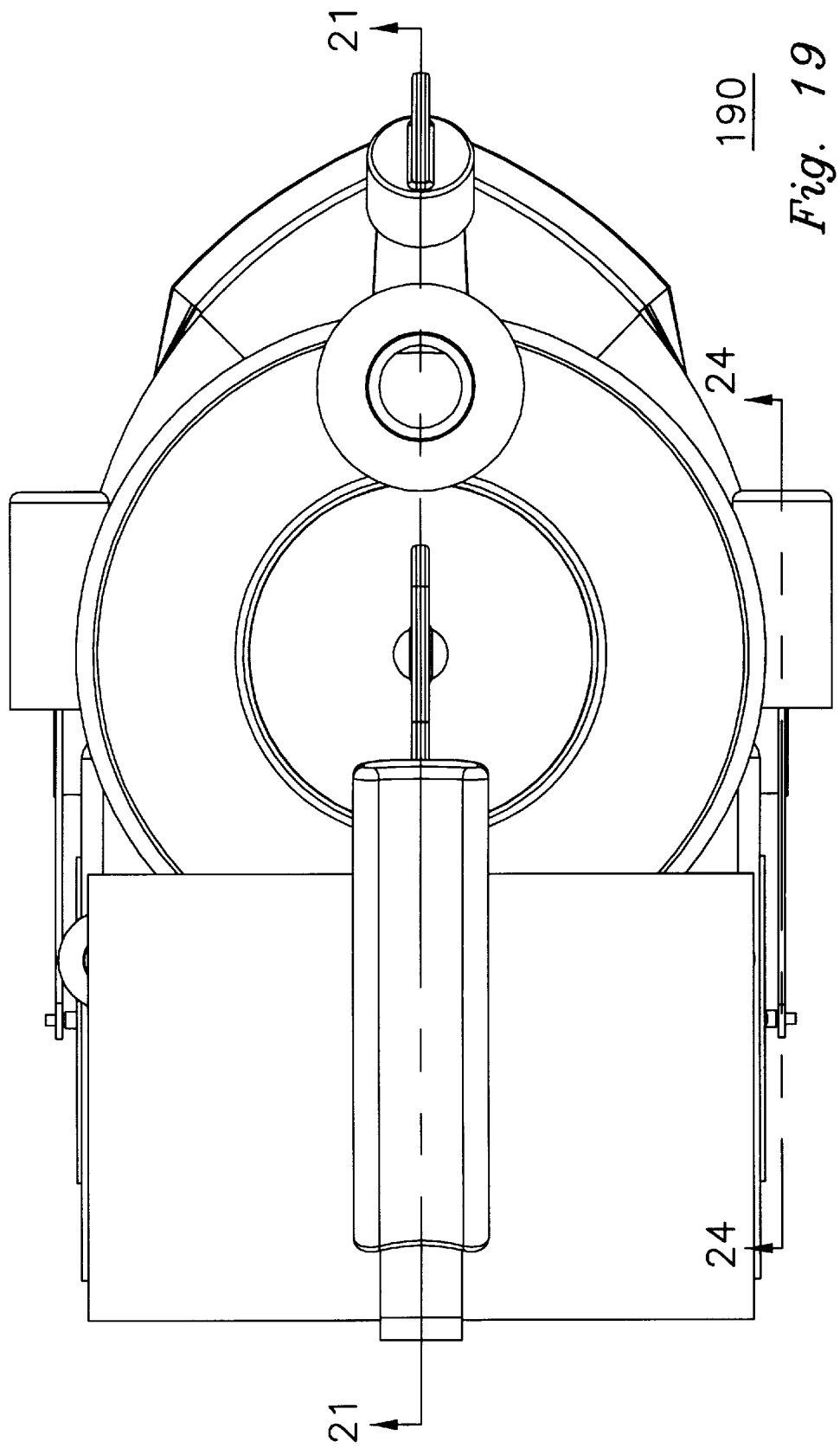
FIG. 19 shows a top view of the third embodiment.
Figure 20:
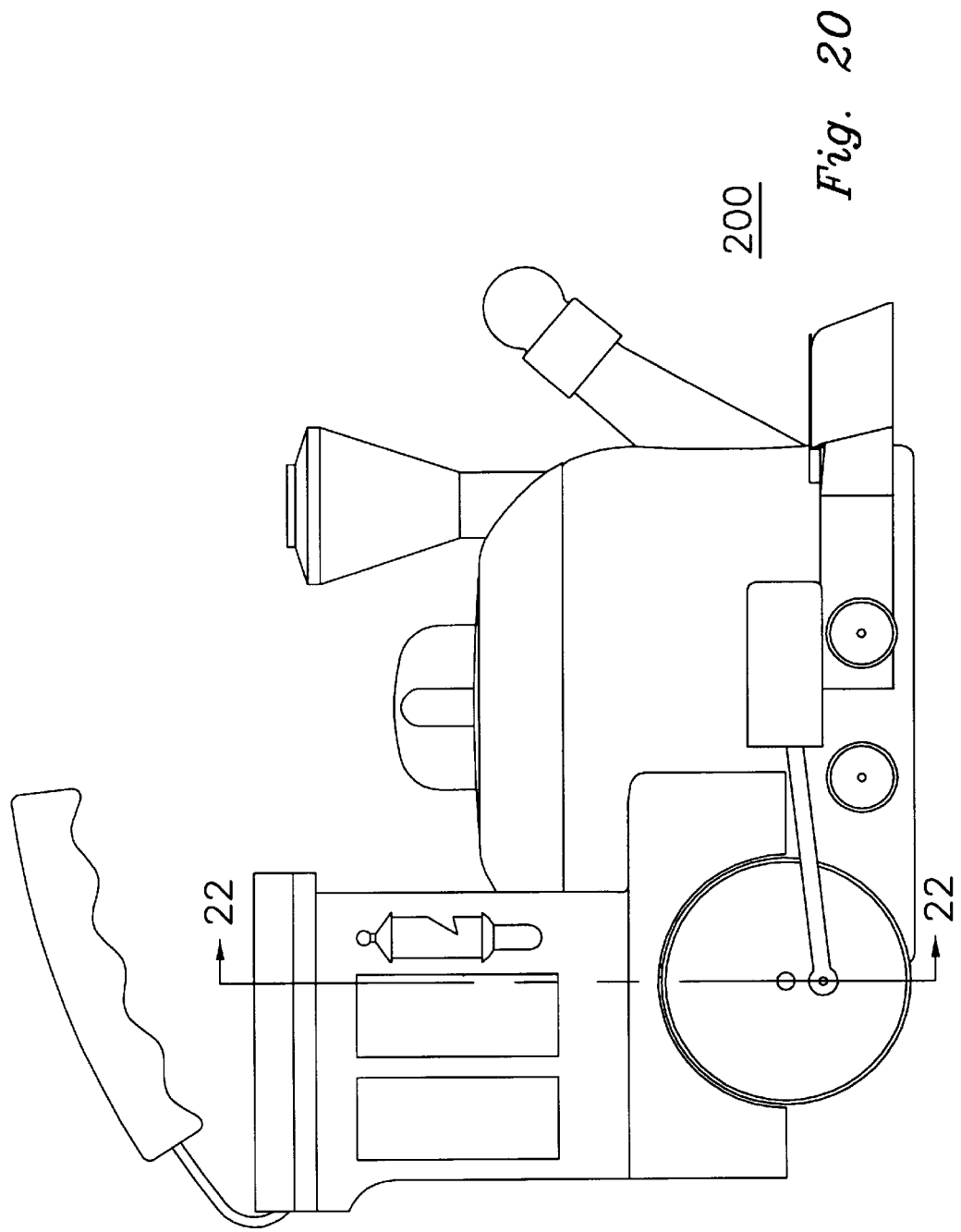
FIG. 20 shows a side view of the third embodiment.
Figure 21:
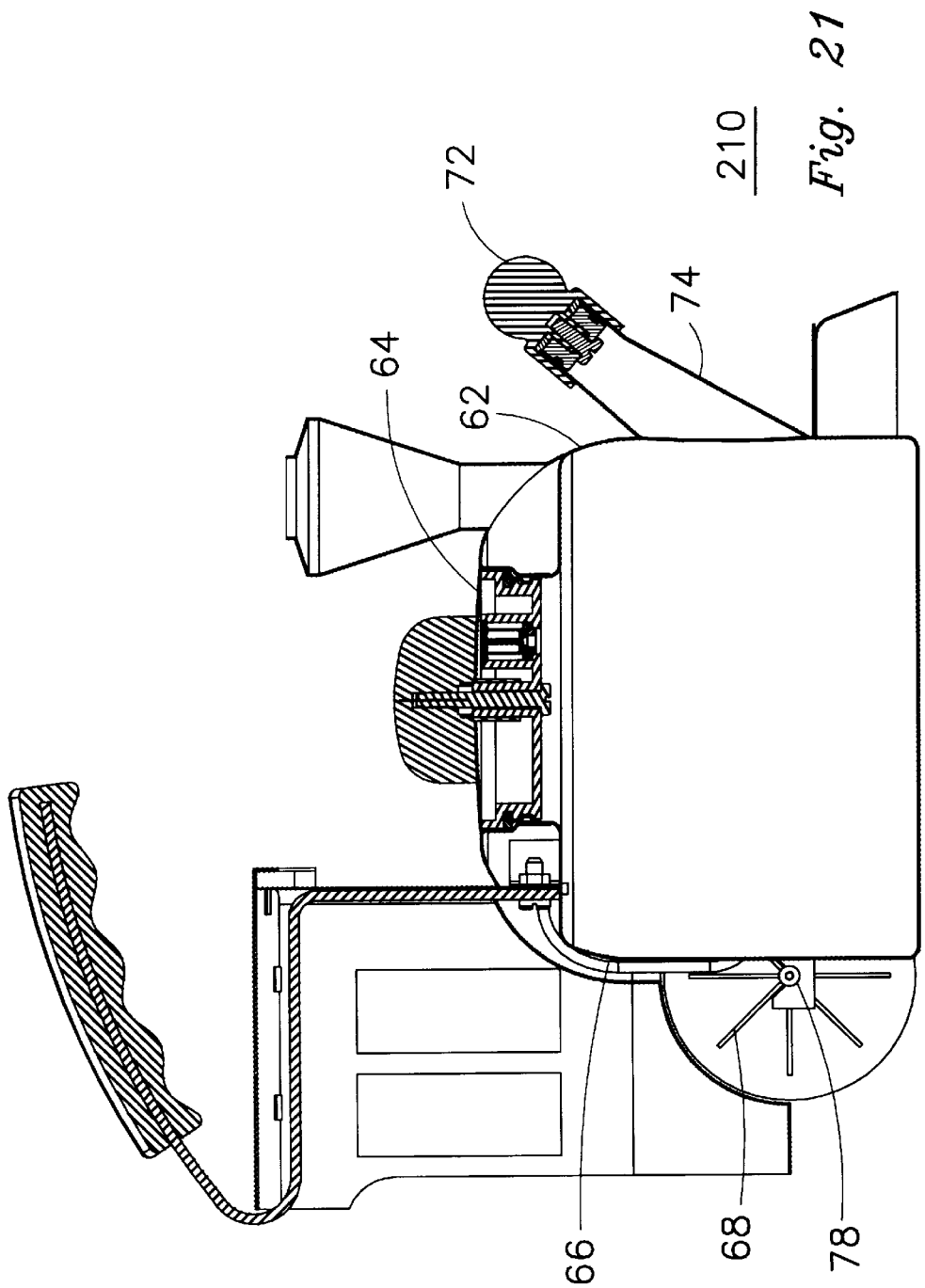
FIG. 21 shows a sectional side view of the third embodiment.
Figure 22:
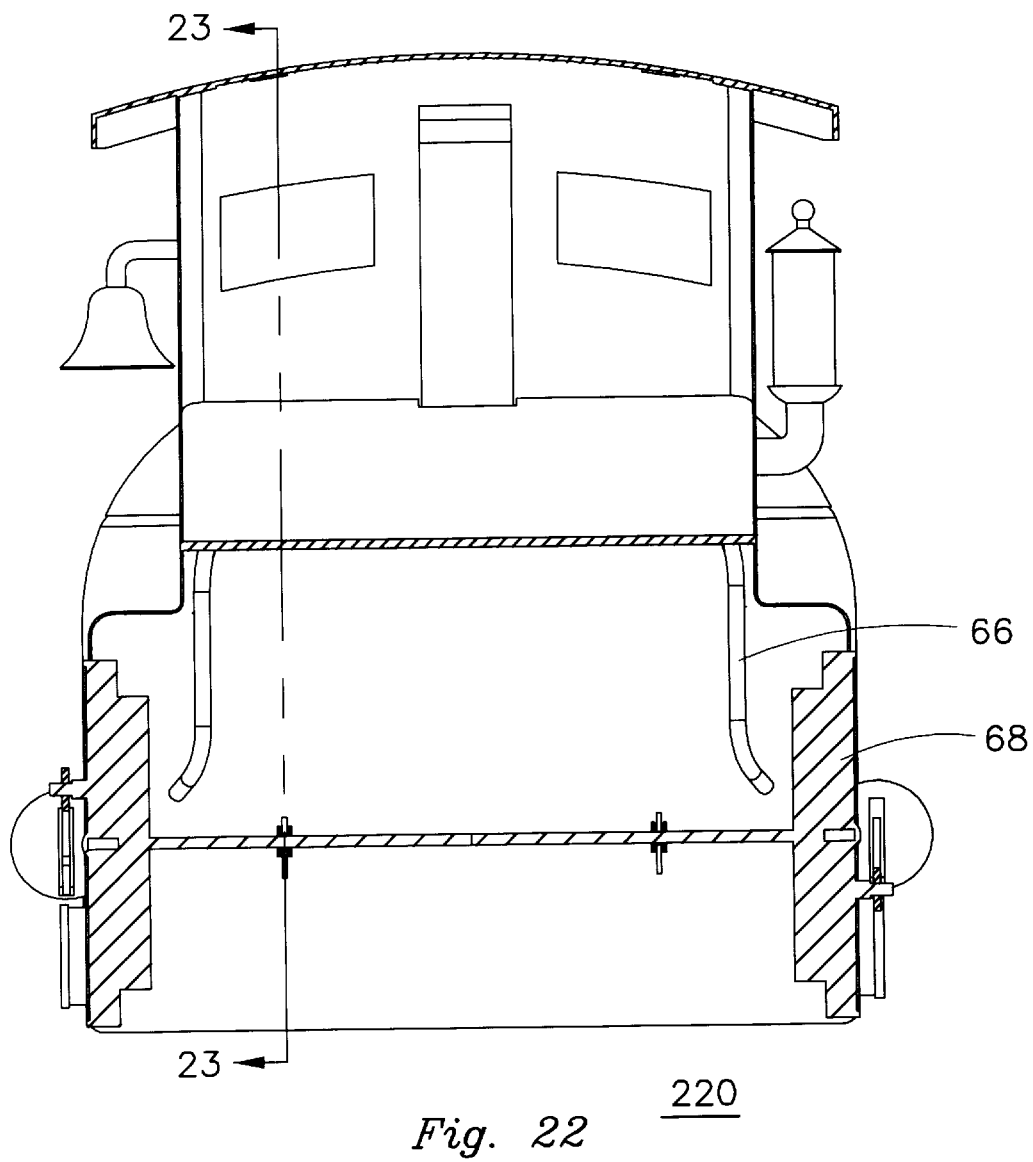
FIG. 22 shows a sectional end view of the third embodiment.
Figure 23:
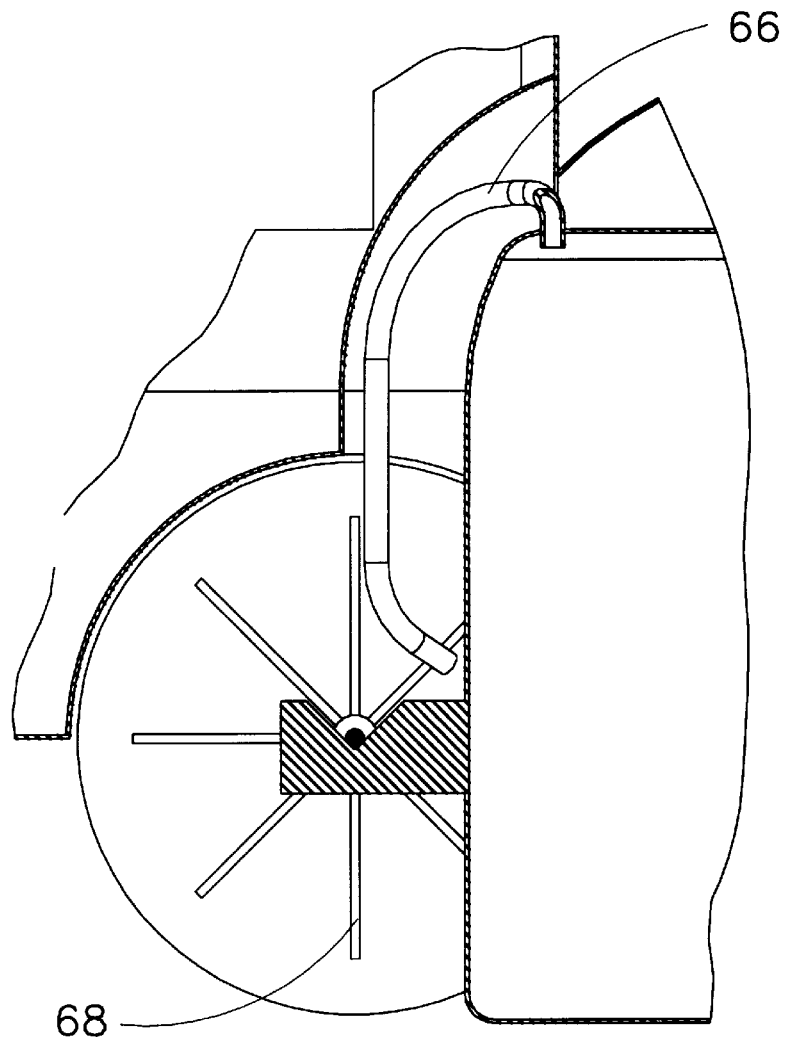
FIG. 23 shows a sectional view of a detail of FIG. 22.
Figure 24:
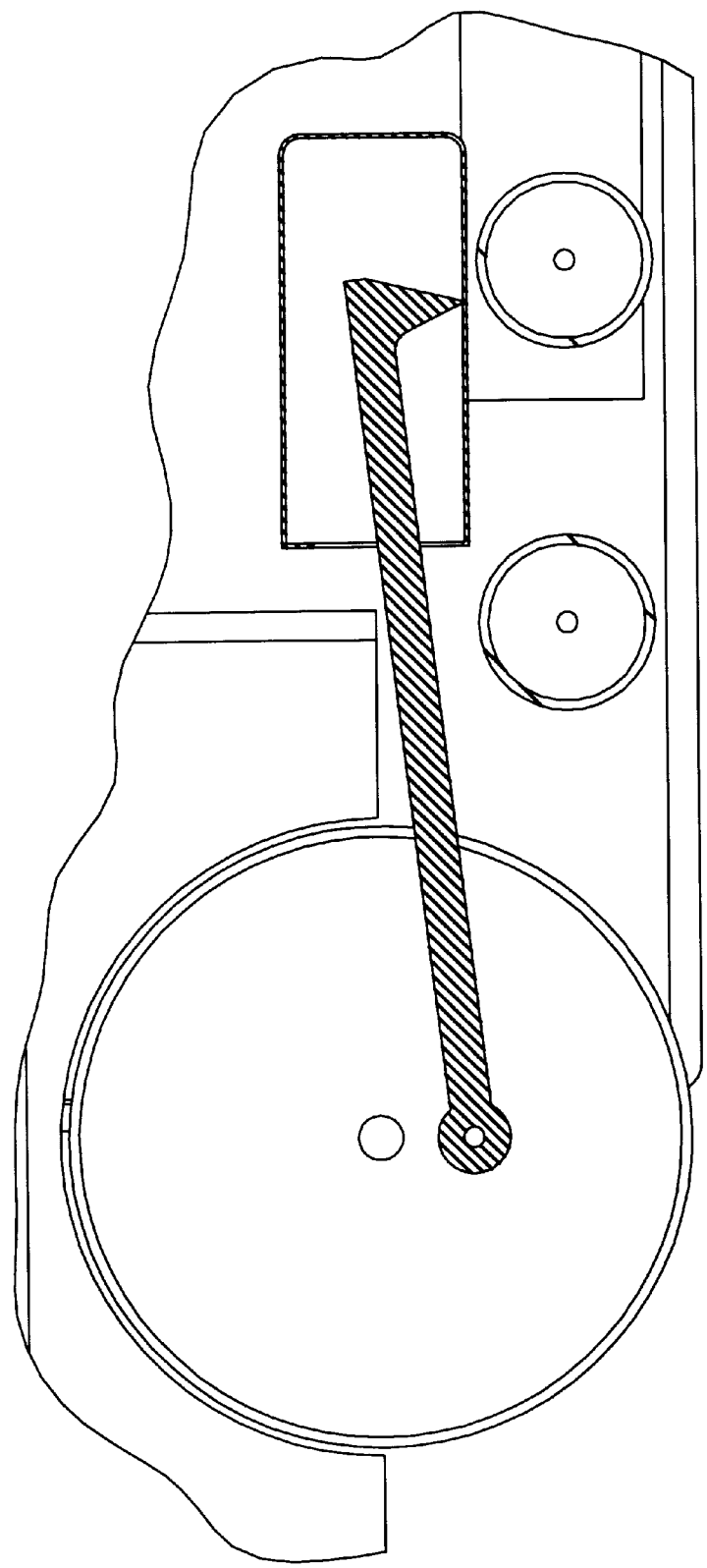
FIG. 24 shows a sectional view of a detail of FIG. 19.

A third embodiment is depicted in FIG. 18. In this type of embodiment, animation is created by steam issuing from a kettle body 62 through a jet 66 to impinge on a plurality of turbine blades, with a blade 68 being shown in FIG. 21. The kettle body 62 of this embodiment is fitted with a lid 64 removably engaged to the kettle body by an arrangement similar to that recited for the first two embodiments. The lid engages the kettle body opening and a spout cap 72 engages a spout 74 with sufficient tightness to allow enough pressure to build withing the kettle body when boiling occurs, for the steam issuing from the jet 66 to drive the turbine blades 68. Animation is provided by the rotation of the turbine assembly 78.

A whistle can also be combined as an element of a kettle according to the present invention without deviating from the teachings of the invention. Accordingly, it is possible to then have a kettle which provides animation for amusement, a visual signal of boiling and an auditory signal of boiling.

What is claimed is:

1. A kettle for boiling water, comprising:

a kettle body adapted for holding water and having an interior and an exterior;

a rotatable housing disposed about the kettle body and comprising a plurality of steam movable turbine blades, in motion providing relation to the rotatable housing for rotating the housing when impinged upon by steam under pressure;

a jet in steam providing relation to the turbine blades, the jet being disposed intermediate the kettle body interior and exterior;

a spout depending from the kettle body; and a spout cap removably engaged to the spout for retaining steam pressure within the kettle body;

wherein the spout cap is removably engaged with force sufficient to retain steam pressure capable of providing motion of the rotatable housing when steam from the jet is provided to the turbine blades.

2. The kettle of claim 1, wherein the kettle body has an opening for introduction of water and a removably engaged lid for closing the opening.

3. The kettle of claim 2, wherein the lid is removably engaged with force sufficient to retain steam pressure capable of providing motion of the rotatable housing when steam from the jet is provided to the turbine blades.

4. The kettle of claim 1, further comprising a steam operable whistle.

5. The kettle of claim 1, wherein the rotatable housing rotates about a substantially vertical axis.

6. The kettle of claim 1, wherein the rotatable housing rotates about a substantially horizontal axis.

7. The kettle of claim 1, wherein the rotatable housing is capable of motion when the jet provides from about 0.5 psi to about 1.5 psi pressure.

8. The kettle of claim 1, wherein the jet has an internal diameter of from about 0.05 inch to about 0.1 inch.

9. The kettle of claim 4, wherein the rotatable housing is capable of motion when the jet provides from about 0.5 psi to about 1.5 psi pressure.

10. The kettle of claim 4, wherein the jet has an internal diameter of from about 0.05 inch to about 0.1 inch.

11. The kettle of claim 4, further comprising a steam operable whistle.

12. The kettle of claim 7, wherein the rotatable housing is capable of motion when the jet provides from about 0.5 psi to about 1.5 psi pressure.

13. The kettle of claim 5, wherein the jet has an internal diameter of from about 0.05 inch to about 0.1 inch.

14. The kettle of claim 5, further comprising a steam operable whistle.

* * * * *